Feb. 18, 1947.   H. E. KALLMANN   2,416,056
RASTER SCREEN
Filed Feb. 21, 1944   5 Sheets-Sheet 3
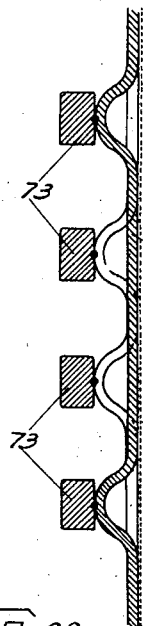
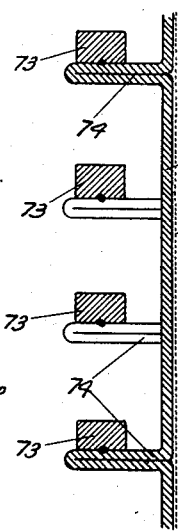
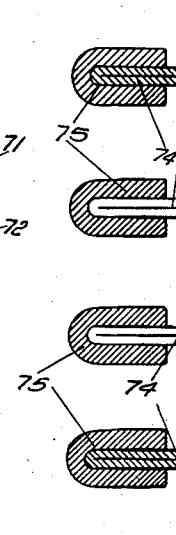
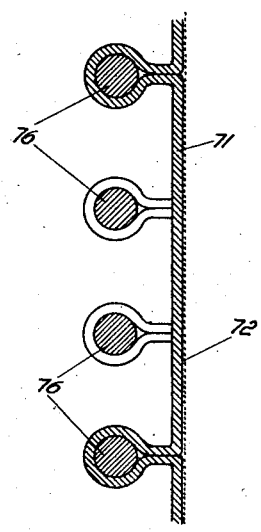
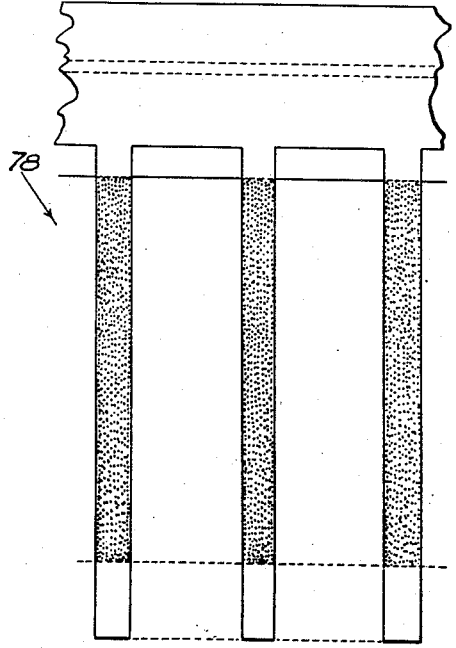
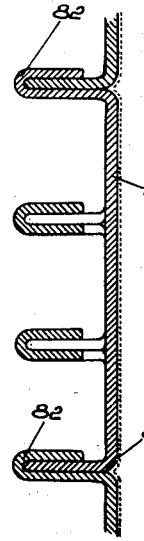
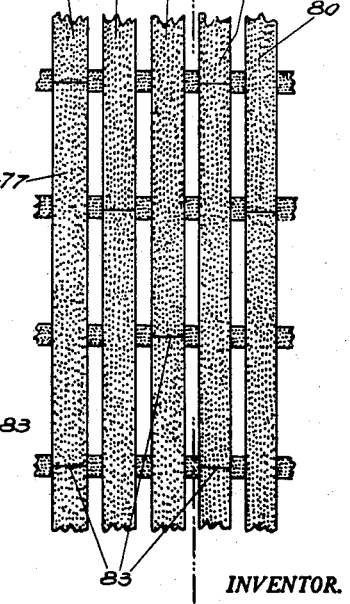
INVENTOR.
Heinz E. Kallmann
BY Michael S. Striker
his agent

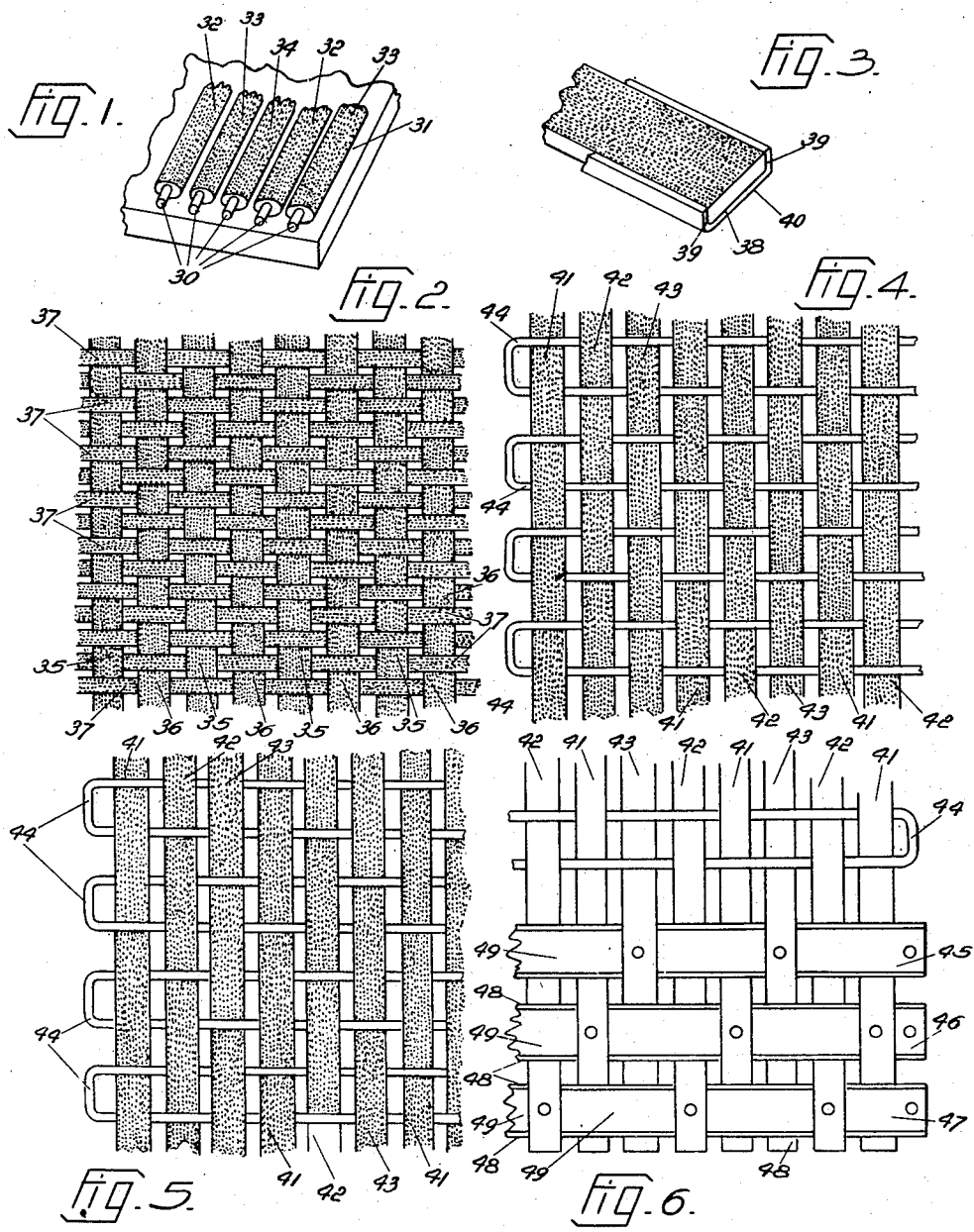

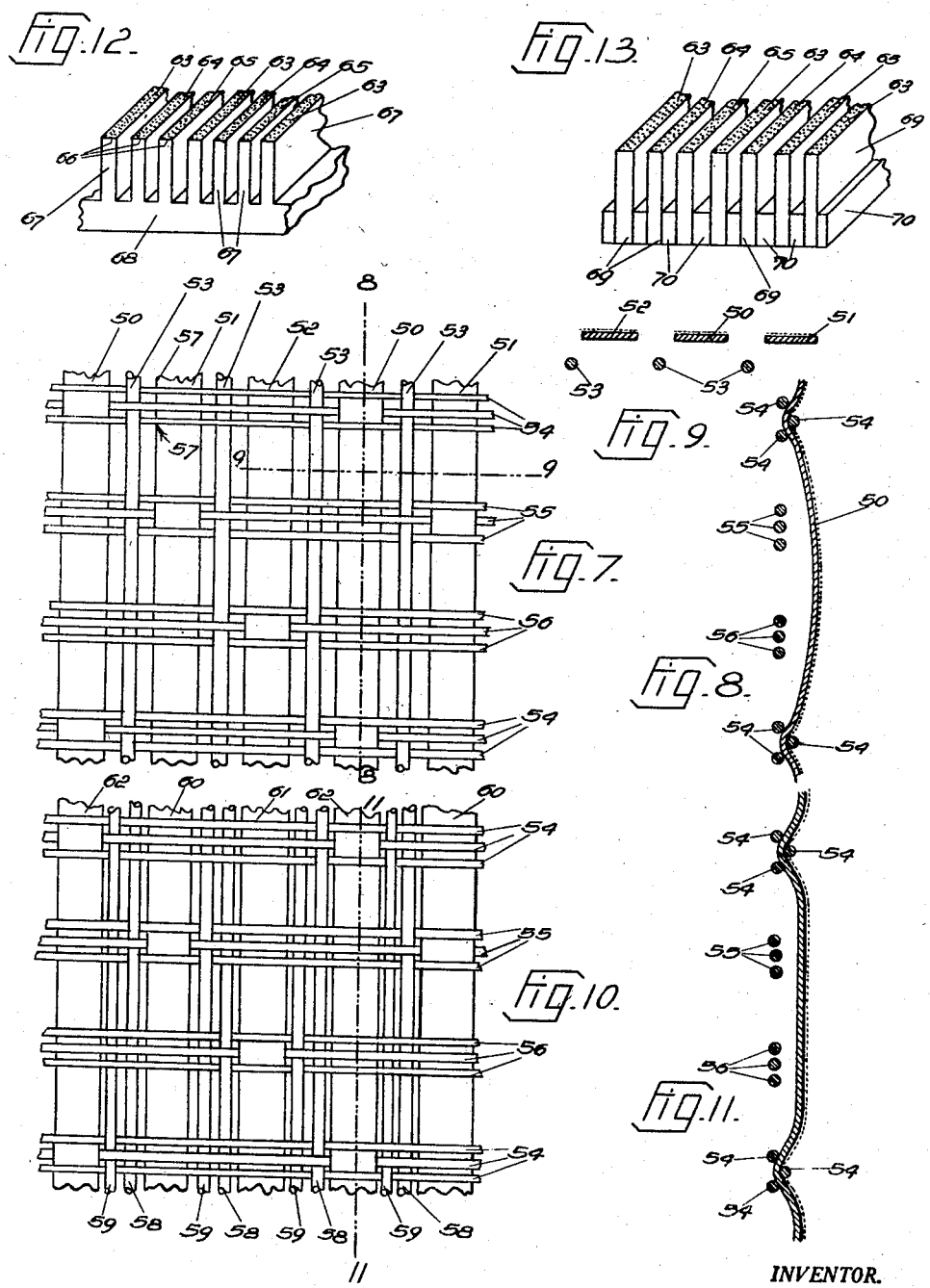

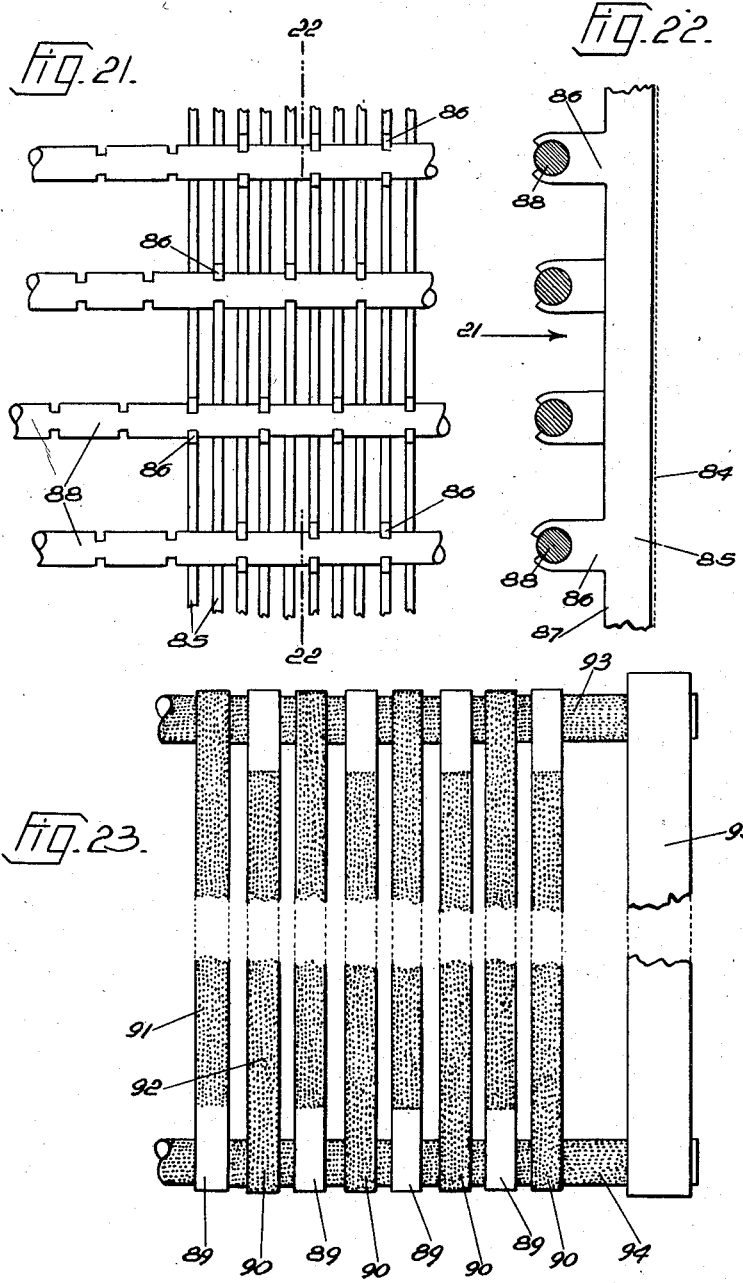

Feb. 18, 1947. H. E. KALLMANN 2,416,056
RASTER SCREEN
Filed Feb. 21, 1944 5 Sheets-Sheet 5
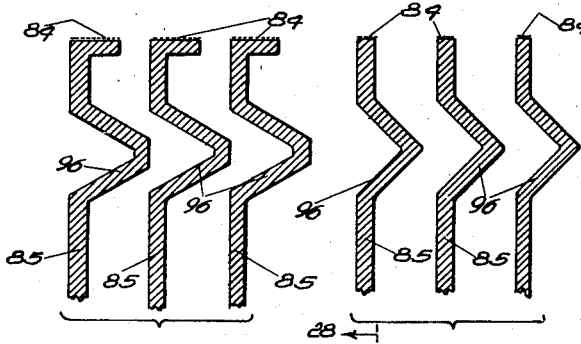
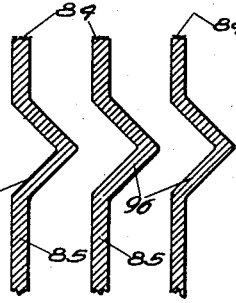
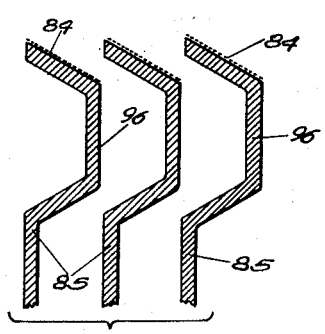
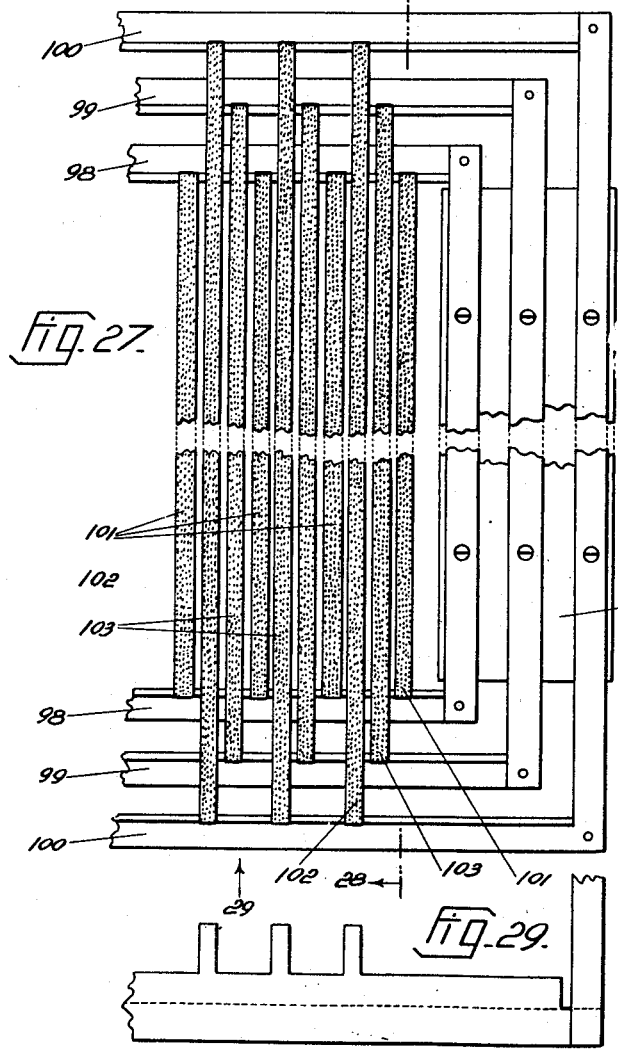
INVENTOR.
Heinz E. Kallmann
BY
his Agent Patented Feb. 18, 1947

2,416,056

UNITED STATES PATENT OFFICE 2,416,056

RASTER SCREEN

Heinz E. Kallmann, Boston, Mass.

Application February 21, 1944, Serial No. 523,185

12 Claims. (Cl. 250—164)

My present invention relates to screens for cathode ray tubes and consists mainly in polychrome raster screens for such tubes.

It is an object of my present invention to provide cathode ray tube screens whose color of fluorescence can be controlled electrically.

It is a further object of my present invention to provide an arrangement in cathode ray tubes which enables simultaneous observation of a group of events on a single cathode ray tube screen, each of the events being represented in a different color.

Still a further object of my present invention consists in means for the presentation of color television images without mechanically activated color filters.

Another object of my present invention consists in new raster screens which are adapted to produce polychrome images by presenting to the eye in rapid succession monochrome images in each of a number of basic colors.

Still another object of my present invention consists of polychrome raster screens adapted to produce in rapid succession images in three different colors such as blue, green and red which will reproduce adequately for the human eye any natural color in the desired hue, saturation and brightness.

It is still another object of my present invention to produce a screen for cathode ray tubes whose color of fluorescence can be rapidly switched to any one, or any combination, of three or more basic colors.

With the above objects in view, my present invention mainly consists of a raster screen for cathode ray tubes composed of a plurality of independent raster systems each of which is adapted to be activated independently from the others so as to attract or repel electrons emitted by the cathode of the tube as desired.

More specifically, my present invention consists of a raster screen for cathode ray tubes composed of a plurality of independent raster line systems consisting of parallel raster line members, the systems interlaced, that is arranged in such a manner that each raster line member of one of these systems is lying parallel to and between raster line members of the other systems. Preferably, the interlaced raster line members of these systems are all evenly spaced.

A preferred embodiment of my new raster screen is composed of a plurality of independent raster line systems, consisting each of substantially parallel raster line members; all raster line members of this raster screen are arranged substantially in one plane, and the raster line members of various raster line systems are interlaced in this plane. In a raster screen of this type, the raster line members of the same raster line system are electrically connected with each other; thus, the raster line members of the same raster line system are adapted to be electrically activated simultaneously and jointly, while the raster line members of the other raster line systems may be electrically activated at other times.

In order to be activated electrically, the raster line systems are composed of electrically conductive, substantially line-shaped members; all of these line members are arranged preferably in one plane in such a manner that each of them belonging to one of the raster line systems is lying in this plane between electrically conductive line-shaped members belonging to other raster line systems, but is electrically insulated from them. Thus, my new raster screen is preferably composed of a plurality of independent electrically conductive raster systems being electrically insulated from each other; preferably each of these raster systems is evenly and equally distributed over the entire surface of the raster screen.

The interlaced but independent raster line systems differ from each other in that they react differently when subjected to electron bombardment. Thus for instance the raster line members of the conductive raster line systems may be coated with different fluorescent materials so as to appear in different colors when they are subjected to electron bombardment.

It is evident that raster line systems of widely different design may be used for the purposes of my present invention.

Among the preferred embodiments of my present invention are raster screens woven of line-shaped electrical conductors forming a plurality of independent raster line systems; the electrical conductors of different raster line systems will then be substantially evenly distributed over the entire surface of the screen while being kept electrically insulated from each other.

If my new raster screens are used as polychrome screens, the three basic colors are represented by interlaced but independent raster systems of fine color lines which cover, close spaced, the whole screen area. These color lines may be produced by depositing fluorescent material of suitable color on narrow bands of an electrically conductive base. Assuming that blue, green and red are used as the three basic colors, all conductors coated with material of blue fluorescence will be connected to each other and to one of three screen terminals; similarly, all green lines of the screen will be connected to a second terminal and all red lines to a third. Thus subdivided, only those screen areas are active which are connected to a high positive potential; the others, which may be held at a potential equal to, or below, that of the cathode, will repel all electrons and thus cannot be activated. By connecting the three basic screen raster systems in turn to a highly positive, or to a repellent negative, potential the color of the screen can thus be changed rapidly.

It is evident that the proposed system requires neither accurate deflection of the electron beam, so as to hit exactly the lines of proper color, nor such good focus that the width of the beam does not exceed that of the color lines. The control of the raster potentials assures automatically that only the correct color can be emitted; yet no beam current is wasted because the lateral electrostatic field between the adjacent negative and positive rasters produces the necessary lateral deflections and concentrates all electrons of the beam onto the lines of the desired raster. At some distance, however, such a screen composed of interlaced positive and negative areas presents a much weaker accelerating field to the electron beam than corresponds to the screen potential of the active raster; thus the deflection sensitivity of the tube in the region of electrostatic scanning deflection is as much increased.

The three basic screen raster systems may be arranged in depth behind each other or in a common plane; in the latter case the three basic images will not register exactly, being laterally displaced by the width of one or two color lines. This fault will be negligible if either the color lines are thin compared with a picture element or if the eye at the proper viewing distance cannot resolve them. Thus very narrow color lines are required for images with high definition, for example at least 3×400 lines, a total of 1200 lines, for a so-called 400 line television picture; each line will be at most .01" thick if the whole picture is 12" high, even less for screens of projection tubes. The inconvenience of producing such fine screen raster systems is balanced by considerable advantages, quite apart from the absence of mechanically moving color filters:

1. All the energy of the electron beam is utilized since no light is lost in color filters;
2. Improved color saturation is possible, comparable to that of a tricolor photometer, since the purity of the three basic colors is limited only by the bandwidth of the monochrome screen materials and not by the excessive loss of light in narrow-band color filters;
3. Permanent color correcting filters may be used independently for the three basic color responses since their bands do not overlap;
4. Moderate afterglow is permissible, bridging the 6 fields of a 2:1 interlaced tricolor picture; the system is inherently free from color hangover since three screen rasters are excited, and emit light, independently;
5. The relative intensity of the three colors can be varied electrically in the receiver, without defocusing, by controlling the three raster potentials independently, both during their active and inactive periods;
6. The system lends itself to simple color synchronization by means of three different types of color field synchronizing pulses, so that each type pulse connects only the desired raster to a high positive voltage; if none of these special color synchronization signals are transmitted, all three raster systems may be at a positive voltage and thus the picture will become automatically a monochrome black-and-white one.

Two principal manufacturing methods are possible to deposit the fluorescent screen material only on its proper conductive band, namely, first, if the conductive base is in the shape of a wire or metal ribbon it may be coated by spraying, settling or any other way before the three raster systems are assembled; and second, if this is not possible, then, in a process of selective coating, electrostatic attraction and repulsion may be used. The screen material may carry a high electric charge when falling, or being blown, past the screen area; the proper conductors, being connected to a high opposite potential, will then attract it and the other two sets will repel it, being charged with the same sign as the screen material. A similar procedure may serve for depositing by electrophoresis in liquids.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1 is a perspective view of a raster screen consisting of parallel raster members secured to an insulating base;

Figure 2 is a front view of a woven raster screen;

Figure 3 is a perspective view of one raster screen member of the woven raster screen shown in Figure 2;

Figures 4 and 5 are front views of two other woven types of raster screens according to my invention;

Figure 6 is a rear view of an end of the woven raster screen shown in Figure 5;

Figure 7 is a rear view of a further embodiment of a woven raster screen according to my present invention;

Figure 8 is a cross section through the screen shown in Figure 7, along line 8—8 of Figure 7;

Figure 9 is a cross section through the screen shown in Figure 7, along 9—9 of Figure 7;

Figure 10 is a rear view of still another embodiment of a woven raster screen according to my present invention;

Figure 11 is a cross section through the screen shown in Figure 10, along line 11—11 of this Figure;

Figures 12 and 13 are perspective views of two raster screens consisting of an insulating base provided with parallel ridges coated with electrically conductive and with fluorescent material;

Figures 14 to 17 are cross sections of various embodiments of my present invention in which ribbon shaped conductors are provided with fluorescent material so as to form a raster screen according to my present invention;

Figure 18 is a top view of still another embodiment of a raster screen consisting of ribbon shaped line members;

Figure 19 is a cross section through the screen shown in Figure 18 along line 19—19;

Figure 20 is one of the screen members of the screen shown in Figures 18 and 19 before bending into the shape shown in Figure 19;

Figure 21 is a rear view of a further embodiment of my new raster screen in which the raster screen members are parallel plates provided along one of their edges with fluorescent material;

Figure 22 is a cross section through the raster screen shown in Figure 21 along line 22—22 of this figure;

Figure 23 is a top view of still a further embodiment of my new screen composed of two systems of line-shaped screen members;

Figures 24 to 26 are cross sections of line members adapted to be used in screens of the type shown in Figures 13, 21 and 22;

Figure 27 is a top view of another raster screen according to my present invention in which the ribbon-shaped raster line members are carried by three sets of parallel supports;

Figure 28 is a cross section through the screen shown in Figure 27 along line 28—28 of that Figure; and Figure 29 is a view of supporting member 100 in Figure 27, before folding.

Among the various methods of producing the required conducting narrow-band rasters an obvious approach would be to deposit a transparent metal layer on an insulating base, such as a glass plate, and then to divide this layer by mechanical ruling or etching into narrow bands separated by insulating gaps, and then to deposit on these conductive bands the screen material. Such a screen would be highly transparent, yet difficult to produce with sufficiently fine lines, good insulation between these lines and reliable electrical contact to all of them.

In a preferred arrangement, the three conducting rasters are made of fine wires or metal ribbons 30 coated with fluorescent material before assembling. In this arrangement shown in Fig. 1, the wires were cut to the length of one edge of the screen, then fastened, for instance by cementing, on a flat, preferably insulating support 31; they are stretched parallel so as to form a single layer, every third wire or ribbon being coated with blue fluorescent material 32, every next following with green fluorescent material 33, and every then following with red fluorescent material 34. The ends of all wires with equal coating are connected to one of the three screen system terminals, as explained above. The narrow gaps between adjacent wires 30 serve as insulation. If the metal wires 30 are thin enough so as to cover only a small fraction of the screen area, this arrangement may serve as a transparent screen.

A further development with a view to increase the insulating path between adjacent color lines is shown in Figures 12 and 13. In the arrangement shown in Figure 12, the color lines are formed by various screen materials 63, 64 and 65 deposited on top of a conductive coating 66 along the top of narrow ridges 67 of an insulator 68, such as glass. Thus the actual separation of the color lines may be many times less than the path through, or along the surface of, the insulator, that is down and up the sides of the tall ridges. The whole raster screen, made up of many ridges—each as long as one side of the picture area—may be formed out of a single piece of the insulating material or it may be assembled by stacking thin plates 69 of the insulator, interlaced with distance plates 70 for the narrow gaps, as shown in Figure 13. The plates may be of different types of colored glass so as to correct the color response of the screen material.

Most further arrangements, as described below, are mainly intended for observation from the side upon which the electron beam impinges, thus benefiting from the increased brightness due to metallic reflection on the conducting base.

The screens shown in Figures 2 to 11 inclusive are produced as fine-meshed fabrics preferably by weaving; I wish to stress, however, that screens of this specific type may also be produced by knitting, lace braiding, and in similar ways, out of at least three different types of threads.

Thus, for instance Figure 2 shows a screen fabric woven of three types of threads. Two types of metal ribbon 35 and 36, e. g., one coated for blue fluorescence and the other for green fluorescence, are used alternately as the warp and a wire 37 or a narrow ribbon is used as the weft, coated for red fluorescence. These three sets of conductors may be insulated from each other in various ways: if the weft is made of a ribbon 37, then the rear 38 and both edges 39 of all the ribbons 35, 36 and 37 may be coated with an insulating layer 40 before weaving, as shown in Figure 3; alternately, all the threads may be completely coated with an insulating layer until the fabric is completed, then this layer removed by abrasion or chemical action from the frontal areas visible in Figure 2 and these areas then coated with fluorescent material with the help of electrostatic selection.

Two other types of woven fabrics are shown in Figures 4 and 5, having in common the use of three different types of conductors 41, 42 and 43 as the warp, one for each color, and the use of an insulating weft 44. They differ in that in the fabric of Figure 5 the weft 44 covers less of the active areas of the warp ribbons 41, 42 and 43, and that it is somewhat easier to separate the ends of the three types of warp ribbons after weaving. One way of doing this would be to pull out first one weft and thus to separate, e. g., the blue ribbons from the two other sets; and then to trim short the ends of those two sets and pull away another weft; this now separates for instance all green ribbons; the red and blue ones can then be separated according to the different length of their ends.

Another way of connecting the three types of ribbon 41, 42 and 43 in the warp to their respective terminals is shown in Figure 6. At the end of weaving one screen, three strips of metal 45, 46 and 47 are inserted between the cleaned ribbons 41, 42 and 43 of the warp where ordinarily the weft 44 would go. The front surfaces and edges of these metal strips 45, 46 and 47 are preferably coated with insulating material 48. Figure 6 shows their blank areas 49, on the rear of a screen woven according to Figure 5. It can be seen that only one type of the warp ribbons 41, 42 and 43 passes to the rear of each of the strips 45, 46 and 47 and can be connected to it by soldering, welding or clamping. Another set of three such strips may also be inserted at the beginning of each screen; thus each conductor 41, 42 and 43 in the warp is doubly connected to its terminal and will continue to be useful even if broken at an intermediate point.

Since the single raster screen members are extremely close to each other, special steps are taken to insure adequate insulation between them. Thus, it is one of the characteristic features of my screens that the path of insulation between areas of different colors is substantially longer than the visible separation of these areas and does preferably not lie in the plane of the image. The types of color raster screens described below have a substantially better insulation between the three basic screen rasters than the woven raster screens dealt with above. Thus, leakage currents are minimized and higher operating voltages are permissible without danger of breakdown due to the considerable potential differences between adjacent raster lines. Another advantage of these types is that a minimum of insulating material is exposed to the scanning electron beam, thus avoiding field distortions due to accumulated electric charges. Using high vacuum as a much better insulator than any known material, all these types of screens are designed so as to put much longer paths through, and along the surface of, any insulating material between adjacent raster lines than corresponds to their actual distance.

Thus, tri-color raster screens with high insulation between adjacent color lines can be devised by modifying the weaving pattern of the textile type screens discussed above; such screens are shown in Figures 7 to 11 inclusive.

In the modification shown in Figure 7 from the reverse side and in Figures 8 and 9 in different cross sections, the wire or metal ribbons 50, 51 and 52 used as warp are coated with three types of screen material. However, one thread 53 of relatively stiff insulating material is inserted between each two of these conductors. The weft of this screen fabric does not act as insulator, each group 54, 55 and 56 of three wefts touching the warp conductors of only one basic raster system. Thus, the weft may be made of wires or metal ribbons provided that the selvage is trimmed off after weaving, so as to interrupt the continuity from weft to weft.

It should be mentioned that the scale of the Figures 7 to 11, as that of most others, is much distorted, since actually the width of one color line has to be of the order of about .01 of an inch, whereas the distance between one group of three wefts to the next group might be of the order of about .3 of an inch. This screen fabric consists essentially of two layers: one is a taut supporting network formed by the weft wires 54, 55 and 56 and only the insulating warp 53; the other consists of the metal ribbons 50, 51 and 52, coated with screen material, which dip into the supporting fabric only about once per inch and form stiff self-supporting arches between these points, as shown in Figure 8. Thus for most of their length, the ribbons 50, 51 and 52 form a screen area distinctly in front of the supporting network, including the insulating warp 53 clearly shown in Figure 9. It is a feature of this screen that, by choice of suitable stiffness of the various components, each group of three wefts 54, 55 and 56 contacts only those metal ribbons 50, 51 and 52 which they tie to the supporting network and that they pass clear behind the two other sets of metal ribbons; since one group of three wefts is separated from its neighbor by at least .3" there is that much insulating path provided along the insulating warp 53.

In the screen fabric described, the outer two of each group of three wefts come very close to the adjacent metal ribbons on points such as the one marked 57 in Figure 7; the insulation at these points depends on the curvature of the metal ribbon. If a tauter and flatter screen is desired, a modification according to Figure 10 may be used, which however requires insertion of two insulating warps 58 and 59 between each two of the metal ribbons 60, 61 and 62. Then, other features being similar, every taut metal ribbon clears the weft supporting the other two sets by at least the thickness of the insulating warp.

The general principle to support the thin conductors of the color lines on three sets of widely spaced cross-beams, lends itself to many different embodiments. Among them is the group described next, dispensing with all insulating material in the picture area. One example is shown in cross section in Figure 14. The wires or metal ribbons 71, coated with screen material 72, are fastened at relatively long intervals, such as 1 inch, onto stiff metallic crossbeams 73, for instance by spot welding. All the crossbeams may be arranged in the same plane, as closely behind the screen as is safe for insulation. Each set of ribbons 71 dips back once per inch into the insulating gap to its own set of crossbeams. All three sets of crossbeams, separated from each other by about .3", may be mounted on an insulating frame surrounding the picture area. The three basic raster systems cannot be manufactured separately and then fitted together; instead screens of any length are produced in a single periodical process: the ribbons 71 of one basic raster system are selected from the tricolor warp, given a suitable kink and welded to a crossbeam, then the ribbons 71 of the next basic raster system are selected and this process, somewhat resembling weaving, is repeated at each cross beam.

Many modifications of the screen shown in Figure 14 are possible. Thus a flat screen can be maintained by folding the ribbons 71 into narrow loops 74 before welding, as shown in Figure 15; or instead of welding, these loops may be clamped into crossbeams 75 of U channel shape, as in Figure 16; or rolled tightly around the beams 76, as in Figure 17.

The coated ribbons 71 may also be formed as branches of the crossbeams, by punching those out of sheet metal 78 in shapes such as in Figure 20 and folding them along the dotted lines into shapes such as shown in cross section in Figure 19. The continuous process of manufacturing such a screen requires bent metallic sheets of the type shown in Figure 20 with three types of coating 79, 80 and 81, inserted in turn and held together by clamping tight the U channel 82 of the preceding bent sheet of the same color after the ribbon shaped branches 71 of each sheet are exactly aligned. The front of the resulting screens will then appear as shown in Figure 18, the subdivisions of the color lines caused by the folds 83.

Yet another arrangement is shown in Figures 21 and 22, lending itself particularly well to dissipation of much heat. The color lines are formed as deposits of screen materials 84 on the thin edges of stiff metal plates 85 punched to a shape, as shown in Figure 22, having lugs 86 on their rear edge 87. These plates 85 are mounted, e. g., by clamping their lugs 86 onto slotted rods 88, serving as crossbeams as shown in Figure 22 from the rear. For assembly, all plates 85 in their proper sequence may be held in a jig or interleaved with thin distance pieces; then one crossbeam 88 after another can be inserted and fastened to the lugs 86 of the plates 85 and to the supporting frame not shown in the figure; the jig, or the distance pieces between the plates, can then be removed leaving an assembly of considerable rigidity.

Finally, a cross beam type of raster screen may be described which may be made translucent for observation from the side averted from the electron beam. The crossbeams of this type of screen are outside the picture area, the conducting ribbons being stretched free for their full length. A simple arrangement of this type, suitable for two colors, is shown in Figure 23. The conductive ribbons 89 and 90 may be made of a transparent insulator, such as quartz; for most of their length they are coated with a transparent conductive coating upon which the two types of screen material 91 and 92 are deposited. All ribbons are stretched tautly across a frame 95 the two end beams 93 and 94 of which are conductive, but insulated from each other. As shown in the figure, the conductive coating of each ribbon 89 or 90 extends over the whole picture area and beyond one of the two beams 93 and 94, leaving however an insulating piece of, e. g., .3" clear in front of the other beam. Thus all ribbons carrying one color are electrically connected to one beam, all others to the other.

In order to adapt the arrangement shown in Figure 23 to a greater number of colors and in order to secure tautness of each freely stretched ribbon by giving each an individual spring suspension, the design may be modified as shown in Figures 27 to 29 for three colors. An insulating frame 97, clearing the picture window, supports on two opposite edges each three banks of springs 98, 99 and 100, each bent from a sheet of spring metal as shown in Figure 29. Each of the ribbons 101, 102 and 103 which may be transparent yet conductive, is fastened to one of the springs 98, 99 and 100 at each end. All ribbons 101, 102 and 103 are held in the same plane. If they are made in three different lengths according to color, so that the shortest set is stretched across the two innermost banks of springs, the longest across the outermost banks, then the three basic screen systems can be assembled independently before being fitted together onto the common insulating frame 97.

In order to improve the rigidity of the conducting plates 85 of the types shown in Figures 21 and 22, and yet to maintain the greatest possible separation between them, they may be given a ribbed cross section. Even for separately assembled systems as that shown in Figures 27 and 28 these ribs may protrude up to a height equalling the separation of adjacent plates and yet will not hinder the collocation of previously assembled basic screens. Such ribs 96 may have shapes as exemplified in Figures 24 to 26, showing only the parts near the coated edge; in plates 85 of substantial depth, several ribs 96 may be provided.

I wish to mention that the new raster screens of the types described need not be plane; they may, in particular, be bent to a spherical shape so as to conform to the focal surface of a Schmidt type or any other type of optical projector.

It should also be stressed that the color lines of my new raster type screens do not need to be parallel to the scanning lines of a television picture. If, on the contrary, they are crossing the scanning lines under a right angle, then any nonlinearity of the vertical scanning deflection will be least harmful without corresponding detriment due to a nonlinear horizontal scanning deflection. The vertical line structure so introduced may somewhat balance the horizontal line structure introduced by the scanning process; and the effect that each color line always integrates over the beam electrons falling toward its two neighbors as well as itself will help to smooth out striations introduced by a steep high-frequency cutoff in the preceding amplifiers.

Those among the screen arrangements outlined before which have, due to the long path through and along the supporting insulators, the best insulation between adjacent color lines, are also those in which the conductors are stretched, without mechanical support, over the longest distances. Under the high voltage differences applied to adjacent conductors, considerable electrostatic forces are set up between them; the mutual electrostatic attraction between neighboring conductors may cause short circuits or mechanical breakdown due to vibrations set up by the cyclic change in their potentials. In order to minimize these effects, one or both of the following means may be applied:

1. For a given number of color lines per inch, the ratio of the thickness of the conductors to their separation may be chosen so as to yield the best compromise between the attracting forces, decreasing as the square of the separation, and their stiffness, being proportional to the cube of their thickness.

2. So as to utilize the inertia of the conductors in order to prevent them from vibrating under the electrostatic forces, the frequency of the cyclic change of the potentials applied to the three basic screens may be made so high, compared with the mechanical resonance frequency of the conductors, that they remain at rest. The cyclic change of screen color may, for instance, take place during the retrace after each scanning line. A picture of 343 lines may serve as an example, presented in each of the three colors twenty times per second. There are thus 6860 lines per sec. of each color, a total of 20,580 lines per second. In this case each basic screen is made positive 6860 times per second, too fast to set up dangerous vibrations in a suitably designed conductor. If the picture is presented in three colors, red ($r$), blue ($b$) and green ($g$), two to one interlaced with an odd number of lines not divisible by three, then the color sequence will be that tabulated in the table.

*Table*

```
Lines: 1:r.; 3:b.; 5:g.; 7:r.; ... 343:r.;  ⎫
       2:b.; 4:g.; 6:r.; 8:b.; ... 342:r.;  ⎪
       1:b.; 3:g.; 5:r.; 7:b.; ... 343:b.;  ⎪
       2:g.; 4:r.; 6:b.; 8:g.; ... 342:b.;  ⎬---- 1/20 sec.
       1:g.; 3:r.; 5:b.; 7:g.; ... 343:g.;  ⎪
       2:r.; 4:b.; 6:g.; 8:r.; ... 342:g.;  ⎪
       1:r.; etc., etc.                     ⎭
```

Precautions are also suggested to avoid any persistent potential difference between adjacent color lines. The necessary potential differences between the three raster line systems may be obtained by superimposing a suitably shaped alternating voltage upon a positive direct current potential, thus never exposing the screens to potential differences betwen adjacent lines for an unduly long time if any voltage fails.

It will be understood that each of the elements described above, or two or more together, may also find a useful application in other types of cathode ray screens differing from the types described above.

While I have illustrated and described the invention as embodied in tri-color raster screens, I do not intend to be limited to the details shown, since various modifications and structural changes may be made without departing in any way from the spirit of my invention. For instance, my present invention can also be used in combination with screens which—when electrically activated and exposed to electron bombardment—instead of emitting light fluorescence, change their transparency or their ability to reflect light.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. Raster screen for a cathode ray tube composed of a plurality of independent raster-line systems consisting of parallel raster-line members arranged in such a manner that the path of surface insulation between adjacent raster-line members is larger than the actual distance between the same and that each raster line member of one of said systems is lying parallel to and between raster line members of the other of said systems.

2. Raster screen for a cathode ray tube composed of a plurality of independent raster line systems consisting each of substantially parallel raster line members, all raster line members of said raster screen being arranged substantially in one plane, that path of surface insulation between adjacent raster-line members being larger than the actual distance between the same and the raster line members of various raster line systems being interlaced.

3. Raster screen for a cathode ray tube composed of a plurality of raster line systems consisting each of a plurality of substantially parallel electrically conductive raster line members, all said electrically conductive raster line members of said raster screen being arranged substantially in one plane in such a manner that the path of surface insulation between adjacent raster-line members is larger than the actual distance between the same and that the electrically conductive raster line members of different raster line systems are interlaced in said plane but electrically insulated from each other.

4. Raster screen for a cathode ray tube composed of a plurality of raster line systems consisting each of a plurality of substantially parallel electrically conductive raster line members, arranged substantially in one plane in such a manner that each of said electrically conductive raster line members of one of said raster line systems is lying in said plane between electrically conductive raster line members of other of said raster line systems electrically insulated from the same so that the path of surface insulation between adjacent raster-line members is larger than the actual distance between the same, and electrical conductors connecting the electrically conductive raster line members of each of said raster line systems, so that said electrically conductive raster line members of each of said systems may be electrically influenced independently and separately from the electrically conductive raster line members of the other raster line systems.

5. Raster screen for a cathode ray tube composed of a plurality of raster line systems consisting each of a plurality of substantially parallel electrically conductive raster line members, being arranged substantially in one plane in such a manner that each of said electrically conductive raster line members of one of said raster line systems is arranged in said plane between electrically conductive raster line members of other of said raster line systems electrically insulated from the same so that the path of surface insulation between adjacent raster-line members is larger than the actual distance between the same, the electrically conductive raster line members of the same raster line systems being of equal construction while the electrically conductive raster line members of various raster line systems differ from each other in construction so that the electrically conductive raster line members of the same raster line systems equally react when electrically influenced and exposed to electron bombardment while the electrically conductive raster line members of the various raster line systems react differently under the same conditions.

6. Raster screen for a cathode ray tube composed of a plurality of independent raster-line systems consisting of parallel raster-line members arranged in such a manner that each raster line member of one of said systems is lying parallel to and between raster line members of the other of said systems so that the path of surface insulation between adjacent raster-line members is larger than the actual distance between the same, the raster line members of various raster line systems coated with different fluorescent materials while the raster line members of the same raster line system are coated with the same fluorescent material.

7. Raster screen for a cathode ray tube composed of a plurality of raster line systems consisting each of a plurality of substantially parallel electrically conductive raster line members coated at least partly with the same fluorescent material in such a manner that the electrically conductive raster line members of different raster line systems are coated with different fluorescent materials, all said electrically conductive raster line members of said raster screen being arranged substantially in one plane so that each of said electrically conductive raster line members of one of said raster line systems is lying in said plane between electrically conductive raster line members of other of said raster line systems electrically insulated from the same in such a manner that the path of surface insulation between adjacent raster-line members is larger than the actual distance between the same.

8. Raster screen for a cathode ray tube composed of a plurality of independent raster line systems consisting of parallel electrically conductive raster line members arranged in such a manner that the raster line members of each of said systems are substantially evenly and equally distributed over the entire surface of said raster screen in such a manner that raster line members of different raster line systems are electrically insulated from each other so that the path of surface insulation between adjacent raster-line members is larger than the actual distance between the same.

9. A raster screen for a cathode ray tube composed of at least one support, a great number of electrically conductive raster line members secured to said support or supports parallel to and electrically insulated from each other in such a manner that the path of surface insulation between adjacent raster-line members is larger than the actual distance between the same, said raster line members forming a plurality of raster line systems, the raster line members within each of said raster line systems being electrically connected with each other and coated with the same fluorescent material, while the raster line members of various raster line systems are coated with different fluorescent material.

10. A raster screen woven at least partly of electrical conductors being electrically insulated from each other, and forming a plurality of raster line systems, the electrical conductors of each of said raster line systems being electrically connected with each other and coated with the same fluorescent material, while the electrical conductors of various raster line systems are coated with different fluorescent materials.

11. A raster screen for a cathode ray tube composed of at least one insulating support, a great number of line-shaped electrical conductors secured to said insulating support or supports parallel to and insulated from each other in such a manner that the path of surface insulation between said line-shaped electrical conductors is larger than the actual distance between the same, said conductors forming a plurality of raster line systems, the conductors of each of said raster line systems being electrically connected with each other and coated with the same fluorescent material, while the conductors of the different raster line systems are coated with different fluorescent materials.

12. A raster screen for a cathode ray tube composed of a plurality of pairs of electrically conductive raster supports, each pair of said raster supports being electrically insulated from the other pairs of raster supports, a great number of line-shaped electrical conductors arranged parallel to and insulated from each other in such a manner that the path of surface insulation between said line-shaped electrical conductors is larger than the actual distance between the same and forming a plurality of raster line systems, the ends of the conductors of each of said raster line systems being secured to one of said pairs of raster supports so that the conductors of each of said raster line systems are electrically connected with each other, the conductors secured to the same pair of raster supports being coated with the same fluorescent material, while the conductors secured to different pairs of raster supports are coated with different fluorescent materials.

HEINZ E. KALLMANN.

REFERENCES CITED

The following references are of record in the file of this patent:

UNITED STATES PATENTS

| Number | Name | Date |
|---|---|---|
| 2,307,188 | Bedford | Jan. 5, 1943 |
| 2,310,863 | Leverenz | Feb. 9, 1943 |
| 2,337,980 | Du Mont et al. | Dec. 28, 1943 |
| 1,934,821 | Rudenberg | Nov. 14, 1933 |
| 1,988,605 | Michelssen | Jan. 22, 1935 |
| 2,267,251 | Okolicsanyi | Dec. 23, 1941 |
| 2,301,254 | Carnahan | Nov. 10, 1942 |
| 2,185,439 | Hinderer | Jan. 2, 1940 |
| 2,239,769 | Batchelor | Apr. 29, 1941 |
| 2,386,074 | Sziklai | Oct. 2, 1945 |